US012761114B2

(12) United States Patent
Ge et al.

(10) Patent No.: US 12,761,114 B2
(45) Date of Patent: Oct. 13, 2026

(54) LENS LOOSENING TEST SYSTEM AND LENS LOOSENING TEST METHOD

(71) Applicant: AAC Optics (Suzhou) Co., Ltd., Suzhou (CN)

(72) Inventors: Dasong Ge, Suzhou (CN); Lei Zhao, Suzhou (CN); Haopeng Zhou, Suzhou (CN); Nan Qiao, Suzhou (CN); Shaoshi Shen, Suzhou (CN); Tianjia Liang, Suzhou (CN)

(73) Assignee: AAG Optics (Suzhou) Co., Ltd., Suzhou (CN)

( * ) Notice: Subject to any disclaimer, the term of this patent is extended or adjusted under 35 U.S.C. 154(b) by 293 days.

(21) Appl. No.: 18/404,796

(22) Filed: Jan. 4, 2024

(65) Prior Publication Data

US 2024/0337558 A1 Oct. 10, 2024

Related U.S. Application Data

(63) Continuation of application No. PCT/CN2023/087405, filed on Apr. 10, 2023.

(51) Int. Cl.
*G01M 11/08* (2006.01)

(52) U.S. Cl.
CPC .................................. *G01M 11/081* (2013.01)

(58) Field of Classification Search
CPC .................................................... G01M 11/081
See application file for complete search history.

(56) References Cited

FOREIGN PATENT DOCUMENTS

| | | | | |
|---|---|---|---|---|
| CN | 208654188 U | * | 3/2019 | |
| CN | 115047067 A | * | 9/2022 | ............. G01M 7/02 |

OTHER PUBLICATIONS

CN115047067_ English translation.*
CN208654188_English translation.*

* cited by examiner

*Primary Examiner* — Xin Y Zhong
(74) *Attorney, Agent, or Firm* — Wiersch Law Group

(57) ABSTRACT

The lens loosening test system includes a processing module, an acquisition module, a speaker, a microphone, and a fixing module. The fixing module is configured to place and fix the lens to be tested. The processing module is configured to send an excitation signal to the acquisition module. The acquisition module is configured to excite the speaker based on the excitation signal. The speaker is configured to generate vibration to drive the lens to be tested to vibrate and generate an audio signal. The microphone is configured to receive and transmit the audio signal to the acquisition module. The acquisition module is further configured to output the audio signal to the processing module. The processing module is further configured to determine whether the lens to be tested is loose or not based on the audio signal. The present application can accurately detect whether the lens is loose or not.

10 Claims, 4 Drawing Sheets

LENS LOOSENING TEST SYSTEM AND LENS LOOSENING TEST METHOD

CROSS REFERENCE TO RELATED APPLICATIONS

The present disclosure is a continuation of PCT Patent Application No. PCT/CN2023/087405, entitled "LENS LOOSENING TEST SYSTEM AND LENS LOOSENING TEST METHOD," filed Apr. 10, 2023, which is incorporated by reference herein in its entirety.

TECHNICAL FIELD

The embodiments of the present application relate to the technical field of lens loosening tests, in particular to a lens loosening test system and a lens loosening test method.

BACKGROUND

As one of the important components of automobiles, on-board lens has been continuously upgraded with the development of intelligent vehicles in recent years. In an auto drive system, a lens is the hardware foundation to realize environment recognition and obstacle warning, and the lens is applied to, or the lens serves as a solution more than 80% of the autopilot technology. Due to the special working environment and state of automobiles, the on-board lens needs to have more stable performance to avoid poor imaging performance under long-term vibration environments. Therefore, the on-board lens generally needs to undergo loosening testes before leaving the factory to detect the loosening characteristics of the lens.

In related technologies, there are two main loosening testing solutions for the on-board lens.

One solution is to listen to the sound by human ears after tapping the lens. There may be differences in the sound between a loose lens and a normal lens after tapping, but these differences are often relatively small and require experienced testers to distinguish. Therefore, this solution has high requirements for testers, and the test efficiency is also low, which makes it difficult to ensure the accuracy of test.

Another solution is to detect the imaging performance of the lens after knocking. In response to the imaging performance deteriorating, it indicates that the lens is loose. This solution can achieve automation and does not require manual operation, but the detection rate is actually very low in actual test. Some loose lenses do not cause changes in optical imaging under short-term knocking, and require a considerable period of vibration excitation to possibly cause changes in imaging performance. Therefore, the test effect of this solution is difficult to meet production requirements.

Therefore, it is necessary to provide a lens loosening test system and a lens loosening test method to improve the efficiency and accuracy in loosening test of lens.

SUMMARY

The objective of the present application is to provide a lens loosening test system and a lens loosening test method to improve the efficiency and accuracy in loosening test of lens.

The technical solutions of the present application are as follows. A lens loosening test system configured to detect whether a lens to be tested is loose or not is provided, and the lens loosening test system includes a processing module, an acquisition module connected to the processing module, a speaker and a microphone connected to the acquisition module, and a fixing module installed on the speaker;

- the fixing module is configured to place and fix the lens to be tested;
- the processing module is configured to send an excitation signal to the acquisition module;
- the acquisition module is configured to excite the speaker based on the excitation signal;
- the speaker is configured to generate vibration to drive the lens to be tested fixed on the fixing module to vibrate and generate an audio signal;
- the microphone is configured to receive the audio signal and transmit the audio signal to the acquisition module;
- the acquisition module is further configured to output the audio signal to the processing module;
- the processing module is further configured to determine whether the lens to be tested is loose or not based on the audio signal.

As an improvement, the lens loosening test system further includes a sound insulation module, where a sound insulation detection environment is formed inside the sound insulation module, and the speaker, the fixing module, and the microphone are arranged inside the sound insulation module.

As an improvement, the lens loosening test system further includes a power amplifier arranged between the acquisition module and the speaker, where the power amplifier is configured to amplify the excitation signal.

As an improvement, the lens loosening test system further includes a preamplifier arranged between the microphone and the acquisition module, where the preamplifier is configured to amplify the audio signal received by the microphone.

As an improvement, the fixing module includes a base fixed on a vibration plate of the speaker and a fixing member arranged on the base, and the fixing member is configured to fix the lens to be tested.

As an improvement, a side of the base away from the speaker inwardly recesses to form a groove for accommodating the lens to be tested, each of side walls of the groove is defined with multiple through holes, the fixing member is a fixing screw, and the fixing screw is threaded with each of the multiple through holes.

A lens loosening test method is provided according to the present application, a lens to be tested is tested using a lens loosening test system according to any one above, and the lens loosening test method includes:

- fixing the lens to be tested on a fixing module;
- sending, by a processing module, an excitation signal to an acquisition module;
- exciting, by the acquisition module, a speaker based on the excitation signal;
- generating, by the speaker, vibration to drive the lens to be tested fixed on the fixing module to vibrate and generate an audio signal;
- receiving, by the microphone, the audio signal, and transmitting, by the microphone, the audio signal to the acquisition module;
- outputting, by the acquisition module, the audio signal to the processing module; and
- determining, by the processing module, whether the lens to be tested is loose or not based on the audio signal.

As an improvement, determining, by the processing module, whether the lens to be tested is loose or not based on the audio signal includes:

processing, by the processing module, the audio signal to obtain a proportion of higher-order harmonics;
obtaining an excitation frequency of the excitation signal;
drawing an audio signal curve based on the proportion of higher-order harmonies and the excitation frequency;
determining whether a proportion of a part of higher-order harmonics within a preset excitation frequency range is greater than a preset threshold or not based on the audio signal curve; and
in response to the proportion of the part of higher-order harmonics within the preset excitation frequency range is greater than the preset threshold, determining that the lens to be tested is loose.

As an improvement, the lens loosening test method further includes:
testing, by the lens loosening test system, multiple lenses that are not loose;
drawing a standard curve based on the proportion of higher-order harmonics and the excitation frequency obtained from the multiple lenses that are not loose; and
obtaining the preset excitation frequency range and the preset threshold based on the standard curve.

The advantageous effect of the present application is that the lens loosening test system provided according to the present application fixes the lens to be tested on the speaker, to drive the lens to be tested to vibrate by the speaker to generate an audio signal, and the audio signal is analyzed by the processing module to determine whether the lens to be tested is loose or not. The lens loosening test system provided according to the present application can effectively detect whether the lens is loose or not with high test efficiency and accuracy.

DETAILED DESCRIPTION

The present application will be further explained in conjunction with the accompanying drawings and embodiments.

Figure 1:
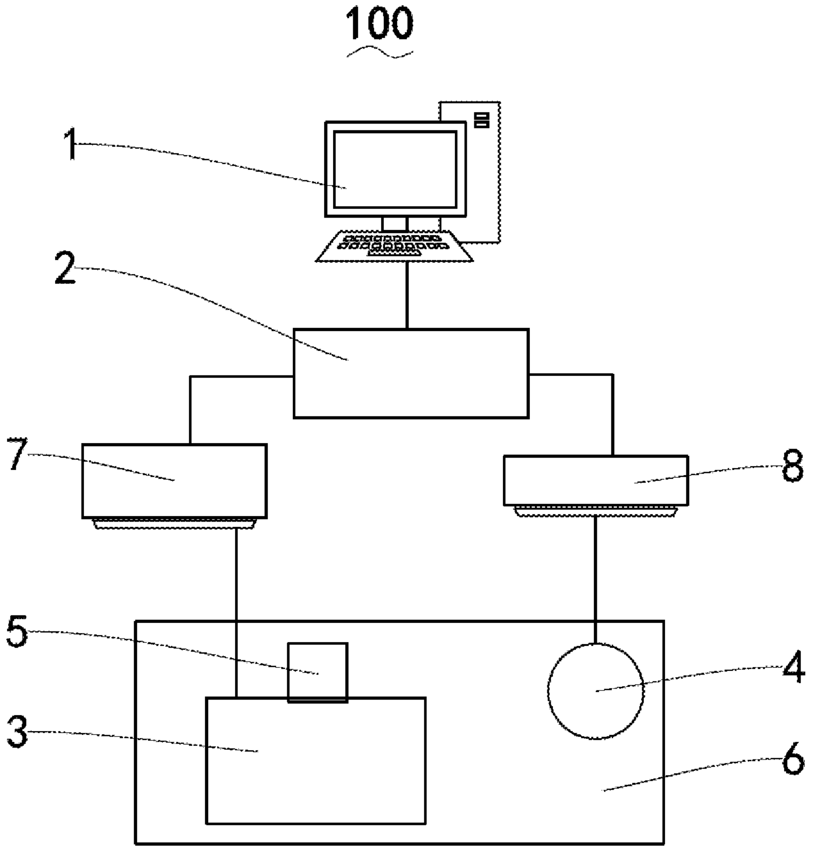
FIG. 1 is a schematic structural view of a lens loosening test system provided according to the present application.
Figure 2:
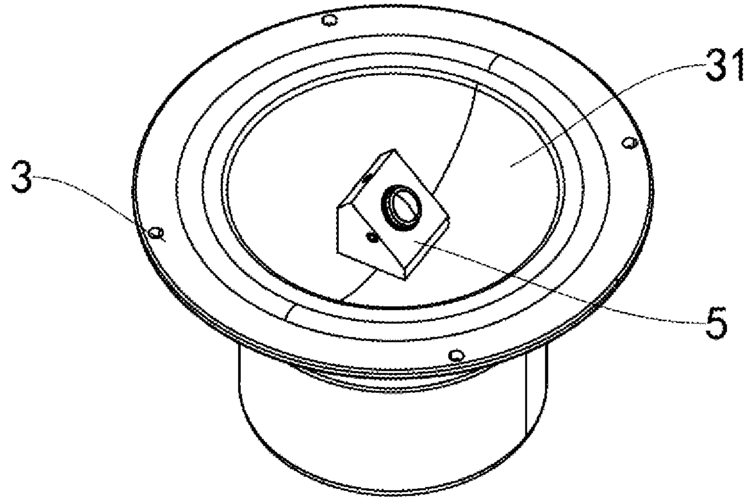
FIG. 2 is a schematic structural view of a speaker and a fixing module of a lens loosening test system provided according to the present application.

As shown in FIG. 1 to FIG. 2, FIG. 1 is a schematic structural view of a lens loosening test system provided according to the present application. FIG. 2 is a schematic structural view of a speaker 3 and a fixing module 5 of a lens loosening test system provided according to the present application. The lens loosening test system 100 of the present application is configured to detect whether the lens to be tested is loose or not, specifically to detect whether the components inside the lens to be tested are loose or not. In this embodiment, the lens to be tested is an on-board lens, and in other embodiments, other lenses may also be tested without limitation.

The lens loosening test system 100 includes a processing module 1, an acquisition module 2, a speaker 3, a microphone 4, and a fixing module 5. Among them, the processing module 1 is connected to the acquisition module 2, the acquisition module 2 is respectively connected to the speaker 3 and the microphone 4, and the fixing module 5 is fixed to the speaker 3. It should be noted that the connection between the processing module 1, the acquisition module 2, the speaker 3, and the microphone 4 is an electrical signal connection. The acquisition module 2 is an acquisition card, and the processing module 1 is an industrial computer.

Specifically, the fixing module 5 is configured to place and fix the fixing module 5. The processing module 1 is configured to send excitation signals with different excitation frequencies to the acquisition module 2. The excitation signals can be preset and modified according to actual needs, such as excitation signals with multiple frequencies within 300 Hz. After receiving the excitation signal, the speaker 3 is configured to generate vibration to drive the lens to be tested fixed on the fixing module 5 to vibrate and generate an audio signal. The microphone 4 is configured to receive the audio signal and transmit the audio signal to the acquisition module 2. The acquisition module 2 is further configured to output the audio signal to the processing module 1. The processing module 1 is further configured to determine whether the lens to be tested is loose based on the audio signal.

Due to the looseness of the internal components of the lens, under the vibration of the speaker 3, the loosened components of the lens will collide with each other and emit sound different from the lens that is not loose. From a signal perspective, there is signal distortion. Therefore, by analyzing the audio signal collected by the microphone 4, it can be determined whether the lens to be tested is loose or not. The specific methods will be explained in detail hereinafter.

The lens loosening test system provided according to the present application fixes the lens to be tested on the speaker, to drive the lens to be tested to vibrate by the speaker to generate an audio signal, and the audio signal is analyzed by the processing module to determine whether the lens to be tested is loose or not. The lens loosening test system provided according to the present application can effectively detect whether the lens is loose or not with high test efficiency and accuracy.

Furthermore, as shown in FIG. 1, the lens loosening test system 100 of the present application further includes a sound insulation module 6. The sound insulation module 6 may be a sound insulation box, and a sound insulation detection environment is formed inside the sound insulation module 6. The speaker 3, the fixing module 5, and the microphone 4 are installed inside the sound insulation module 6. The sound isolation box can enable the microphone 4 to better receive the audio signal and isolate the influence of external environment, which avoids inaccurate test due to external noise.

Furthermore, as shown in FIG. 1, the lens loosening test system 100 of the present application further includes a power amplifier 7 arranged between the acquisition module 2 and the speaker 3, and the power amplifier 7 is configured to amplify the excitation signal. Specifically, an end of the power amplifier 7 is connected to the acquisition module 2, and the other end of the power amplifier 7 is connected to the speaker 3. By setting the power amplifier 7, the excitation signal sent by the acquisition module 2 can be amplified to generate sufficient drive force to drive the speaker 3 for operation.

Furthermore, as shown in FIG. 1, the lens loosening test system 100 of the present application further includes a preamplifier 8 arranged between the microphone 4 and the acquisition module 2, and the preamplifier 8 is configured to amplify the audio signal received by the microphone 4. Specifically, an end of the preamplifier 8 is connected to the microphone 4, and the other end of the preamplifier 8 is connected to the acquisition module 2. By setting the preamplifier 8, the audio signal collected by the microphone 4 can be amplified.

Figure 3:
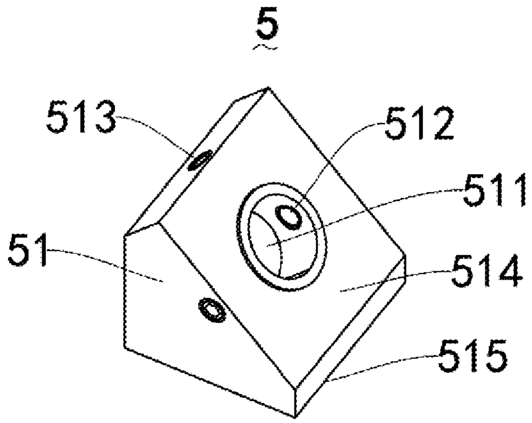
FIG. 3 is a schematic structural view of a fixing module of a lens loosening test system provided according to the present application.
Figure 4:
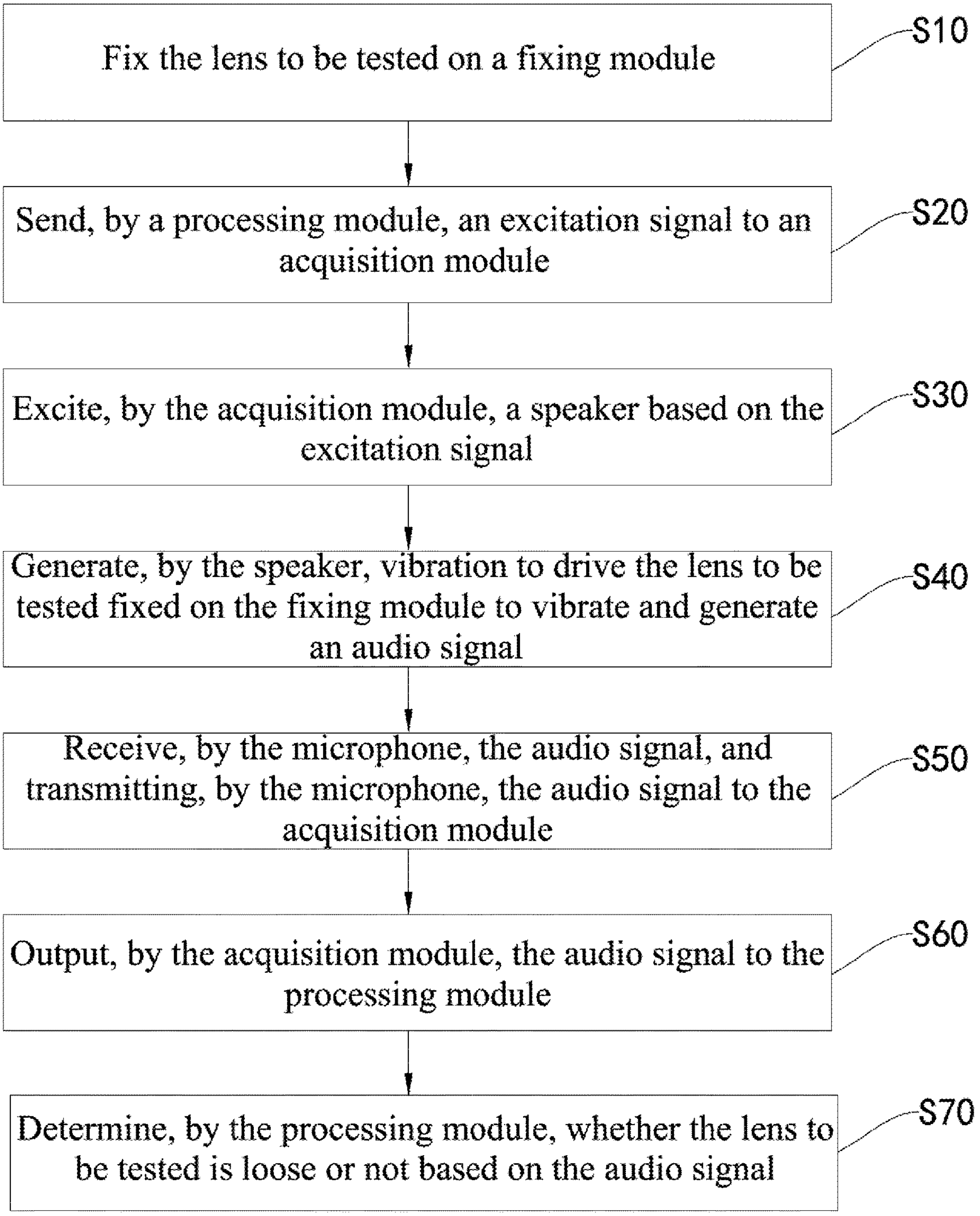
FIG. 4 is a flowchart of a lens loosening test method provided according to the present application.

Furthermore, as shown in FIG. 2 to FIG. 3, the fixing module 5 includes a base 51 fixed on a vibration plate 31 of the speaker 3 and a fixing member 513 arranged on the base 51. The fixing member 513 is configured to fix the lens to be tested. In this embodiment, a side of the base 51 away from the speaker 3 has a mounting surface 514 is partially recessed to inwardly form a groove 511 for accommodating the lens to be tested, each of side walls of the groove 511 is defined with multiple through holes 512, the fixing member 513 is a fixing screw, and the fixing screw is threaded with each of the multiple through holes 512. A side of the base 51 facing the speaker 3 has a bottom surface 515 that is secured to the speaker 3, and the mounting surface 514 is angled relative to the bottom surface 515 so that the lens to be tested is installed at a tilt within the groove 511. In other embodiments, the fixing module 5 may also be fixed to the lens to be tested using other implementation methods, such as using a clamping structure.

A lens loosening test method is further provided according to the present application, a lens to be tested is tested using a lens loosening test system according to any one above, and the lens loosening test method includes the following operations S10 to S70.

In operation S10, the lens to be tested is fixed on a fixing module.

Specifically, the lens to be tested is arranged in a groove 511 of the base 51 and the lens to be tested is fixed by fixing screws.

In operation S20, an excitation signal is sent by a processing module to an acquisition module.

Specifically, the excitation signals are excitation signals with different excitation frequencies, which can be preset and modified according to actual needs, such as excitation signals with multiple frequencies within 300 Hz. For example, in a range of 50 Hz to 300 Hz, a value is taken every 10 Hz interval as the frequency of the excitation signal, so the excitation signals have with multiple excitation frequencies.

In operation S30, a speaker is excited by the acquisition module based on the excitation signal.

Specifically, the excitation signals sent by the acquisition module 2 can be amplified by the power amplifier 7.

In operation S40, vibration is generated by the speaker to drive the lens to be tested fixed on the fixing module to vibrate and generate an audio signal.

In operation S50, the audio signal is received by the microphone, and the audio signal is transmitted by the microphone to the acquisition module.

Specifically, the audio signal received by the microphone 4 can be amplified by the preamplifier 8.

In operation S60, the audio signal is outputted by the acquisition module to the processing module.

In operation S70, whether the lens to be tested is loose or not is determined by the processing module based on the audio signal.

Figure 5:
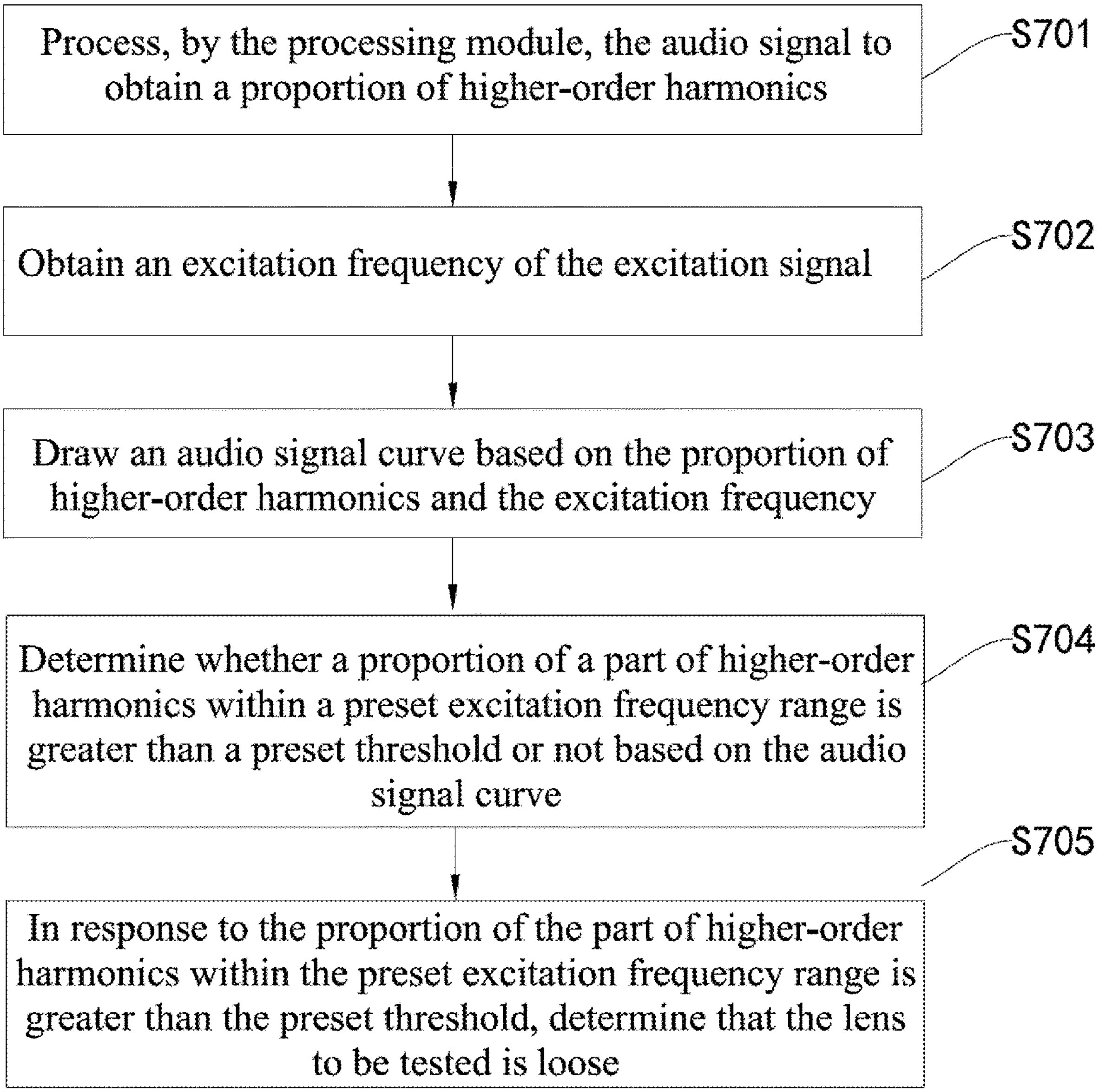
FIG. 5 is a flowchart of determining whether a lens to be tested is loose or not in a lens loosening test method provided according to the present application.

Specifically, the audio signal is analyzed in the operation S70, as shown in FIG. 5, which includes the following sub operations S701 to S705.

In sub operation S701, the audio signal is processed by the processing module to obtain a proportion of higher-order harmonics.

Specifically, for any composite periodic vibration function, the Fourier series decomposition is represented as: the first term is called the mean or direct current component, the second term is the fundamental or fundamental vibration, the third term is the second harmonic, and so on. Alternatively, after the second harmonic, they are collectively referred to as higher-order harmonics. In the present application, the processing module 1 is configured to process the audio signal into a composite periodic vibration function, a proportion of higher-order harmonics is a ratio of higher-order harmonies to the composite periodic vibration function.

In sub operation S702, an excitation frequency of the excitation signal is obtained.

Specifically, the excitation signal includes multiple excitation signals with different excitation frequencies, for example, in a range of 50 Hz to 300 Hz, a value is taken every 10 Hz interval as the frequency of the multiple excitation signals.

In sub operation S703, an audio signal curve is drawn based on the proportion of higher-order harmonics and the excitation frequency.

Specifically, the audio signal curve is drawn with the horizontal axis as the excitation frequency and the vertical axis as the proportion of higher-order harmonics.

In sub operation S704, whether a proportion of a part of higher-order harmonies within a preset excitation frequency range is greater than a preset threshold or not is determined based on the audio signal curve.

Specifically, the preset excitation frequency range and the preset threshold can be set according to actual needs. In the present application, the preset excitation frequency range and the preset threshold are obtained through the following operations:

- testing, by the lens loosening test system, multiple lenses that are not loose;
- drawing a standard curve based on the proportion of higher-order harmonics and the excitation frequency obtained from the multiple lenses that are not loose; and
- obtaining the preset excitation frequency range and the preset threshold based on the standard curve.

Specifically, multiple lenses that are not loose are obtained first, and the multiple lenses that are not loose are used to obtain the corresponding audio signal through operations S10 to S60. After that, the processing module 1 perform operations S701 to S703 on the obtained audio signal, and a corresponding audio signal curve is drawn based on the proportion of higher-order harmonics obtained from the multiple lens that are not loose and the excitation frequency, the corresponding audio signal curve is taken as & standard curve. The standard curve is analyzed to obtain the preset excitation frequency range and the preset threshold. Specifically, several loose lenses can be tested to obtain audio signal curves. The difference between the audio signal curve of the loose lens and the standard curve can be analyzed, and the excitation frequency range corresponding to the proportion of higher-order harmonies that can distinguish between lenses that are not loose and loose lenses can be identified, and a distinguishing threshold can be defined. For example, in a range of 50 Hz to 300 Hz, the proportion of higher-order harmonics in the standard curve varies very little, not exceeding 0.15. However, in this range, the variation of the proportion of higher-order harmonies in the audio signal curve of the loose lens is very large, and there are several positions exceeding 0.15, so that the preset excitation frequency range can be set to 50 Hz to 300 Hz, and the preset threshold value can be set to 0.15. In response to the lens to be tested being tested, it is only necessary to determine whether the proportion of several higher-order harmonics within the preset excitation frequency range is greater than the preset threshold or not based on the audio signal curve.

In sub operation S705, in response to the proportion of the part of higher-order harmonics within the preset excitation frequency range is greater than the preset threshold, the lens to be tested is determined to be loose.

Specifically, in sub operation S705, in response to the proportion of higher-order harmonics within the preset excitation frequency range being less than the preset threshold, it is determined that the lens to be tested is not loose. In response to there being at least one proportion of higher-order harmonics within the preset excitation frequency range greater than the preset threshold, it is determined that the lens to be tested is loose.

By using the above method, it is possible to effectively detect whether the lens is loose with high test efficiency and accuracy.

The above are only the embodiments of the present application. It should be pointed out that for those of ordinary skill in the art, improvements may be made without departing from the inventive concept of the present application, and the improvements shall fall with the scope of protection of the present application.

What is claimed is:

1. A lens loosening test system configured to detect whether a lens to be tested is loose or not, comprising a processing module, an acquisition module connected to the processing module, a speaker and a microphone connected to the acquisition module, and a fixing module installed on the speaker;

wherein the fixing module is configured to place and fix the lens to be tested;

the processing module is configured to send an excitation signal to the acquisition module;

the acquisition module is configured to excite the speaker based on the excitation signal;

the speaker is configured to generate vibration to drive the lens to be tested fixed on the fixing module to vibrate and generate an audio signal;

the microphone is configured to receive the audio signal and transmit the audio signal to the acquisition module;

the acquisition module is further configured to output the audio signal to the processing module; and the processing module is further configured to determine whether the lens to be tested is loose or not based on the audio signal;

wherein the fixing module comprises a base fixed on a vibration plate of the speaker and a fixing member arranged on the base, and the fixing member is configured to fix the lens to be tested; and a side of the base away from the speaker has a mounting surface that is partially recessed to inwardly form a groove for accommodating the lens to be tested, each of side walls of the groove is defined with a plurality of through holes, the fixing member is a fixing screw, and the fixing screw is threaded with each of the plurality of through holes: a side of the base facing the speaker has a bottom surface that is secured to the speaker, and the mounting surface is angled relative to the bottom surface so that the lens to be tested is installed at a tilt within the groove.

2. The lens loosening test system according to claim 1, further comprising a sound insulation module, wherein a sound insulation detection environment is formed inside the sound insulation module, and the speaker, the fixing module, and the microphone are arranged inside the sound insulation module.

3. The lens loosening test system according to claim 1, further comprising a power amplifier arranged between the acquisition module and the speaker, wherein the power amplifier is configured to amplify the excitation signal.

4. The lens loosening test system according to claim 1, further comprising a preamplifier arranged between the microphone and the acquisition module, wherein the preamplifier is configured to amplify the audio signal received by the microphone.

5. A lens loosening test method, wherein a lens to be tested is tested using a lens loosening test system according to claim 1, and the lens loosening test method comprising:

fixing the lens to be tested on a fixing module;

sending, by a processing module, an excitation signal to an acquisition module;

exciting, by the acquisition module, a speaker based on the excitation signal;

generating, by the speaker, vibration to drive the lens to be tested fixed on the fixing module to vibrate and generate an audio signal;

receiving, by the microphone, the audio signal, and transmitting, by the microphone, the audio signal to the acquisition module;

outputting, by the acquisition module, the audio signal to the processing module; and determining, by the processing module, whether the lens to be tested is loose or not based on the audio signal.

6. A lens loosening test method, wherein a lens to be tested is tested using a lens loosening test system according to claim 2, and the lens loosening test method comprising:

fixing the lens to be tested on a fixing module;

sending, by a processing module, an excitation signal to an acquisition module;

exciting, by the acquisition module, a speaker based on the excitation signal;

generating, by the speaker, vibration to drive the lens to be tested fixed on the fixing module to vibrate and generate an audio signal;

receiving, by the microphone, the audio signal, and transmitting, by the microphone, the audio signal to the acquisition module;

outputting, by the acquisition module, the audio signal to the processing module; and determining, by the processing module, whether the lens to be tested is loose or not based on the audio signal.

7. A lens loosening test method, wherein a lens to be tested is tested using a lens loosening test system according to claim 3, and the lens loosening test method comprising:

fixing the lens to be tested on a fixing module;

sending, by a processing module, an excitation signal to an acquisition module;

exciting, by the acquisition module, a speaker based on the excitation signal;

generating, by the speaker, vibration to drive the lens to be tested fixed on the fixing module to vibrate and generate an audio signal;

receiving, by the microphone, the audio signal, and transmitting, by the microphone, the audio signal to the acquisition module;

outputting, by the acquisition module, the audio signal to the processing module; and determining, by the processing module, whether the lens to be tested is loose or not based on the audio signal.

8. A lens loosening test method, wherein a lens to be tested is tested using a lens loosening test system according to claim 4, and the lens loosening test method comprising:

fixing the lens to be tested on a fixing module;

sending, by a processing module, an excitation signal to an acquisition module;

exciting, by the acquisition module, a speaker based on the excitation signal;

generating, by the speaker, vibration to drive the lens to be tested fixed on the fixing module to vibrate and generate an audio signal;

receiving, by the microphone, the audio signal, and transmitting, by the microphone, the audio signal to the acquisition module;

outputting, by the acquisition module, the audio signal to the processing module; and determining, by the processing module, whether the lens to be tested is loose or not based on the audio signal.

9. The lens loosening test method according to claim 5, wherein determining, by the processing module, whether the lens to be tested is loose or not based on the audio signal comprises:

processing, by the processing module, the audio signal to obtain a proportion of higher-order harmonics;

obtaining an excitation frequency of the excitation signal;

drawing an audio signal curve based on the proportion of higher-order harmonics and the excitation frequency;

determining whether a proportion of a part of higher-order harmonics within a preset excitation frequency range is greater than a preset threshold or not based on the audio signal curve; and in response to the proportion of the part of higher-order harmonics within the preset excitation frequency range is greater than the preset threshold, determining that the lens to be tested is loose.

10. The lens loosening test method according to claim 9, further comprising:

testing, by the lens loosening test system, a plurality of lenses that are not loose;

drawing a standard curve based on the proportion of higher-order harmonics and the excitation frequency obtained from the plurality of lenses that are not loose; and obtaining the preset excitation frequency range and the preset threshold based on the standard curve.

* * * * *